Figure 1:
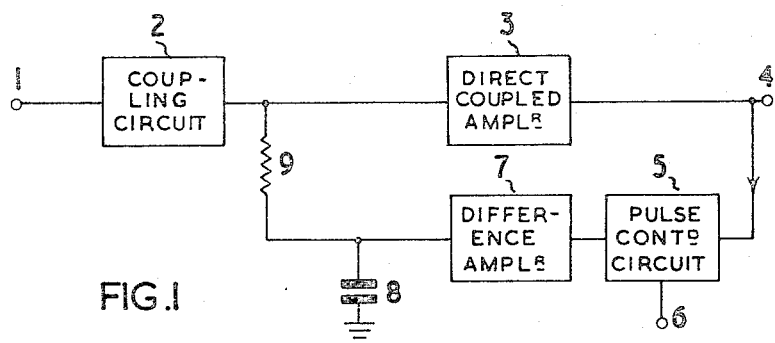

INVENTORS
JOHN LEWIS EDWIN BALDWIN
DEREK JOHN PARKYN

ATTORNEYS

United States Patent Office 3,309,615
Patented Mar. 14, 1967

3,309,615
SIGNAL LEVEL CONTROL APPARATUS
John Lewis Edwin Baldwin, Croydon, Surrey, and Derek John Parkyn, Sanderstead, Surrey, England, assignors to Rank-Bush Murphy Limited, London, England, a British company
Filed Feb. 4, 1964, Ser. No. 342,867
Claims priority, application Great Britain, Feb. 12, 1963, 5,664/63
7 Claims. (Cl. 328—175)

This invention relates to signal level control apparatus operable to maintain a periodically recurrent reference level in an applied signal at a predetermined value. The requirement for such apparatus exists primarily in television systems, but the invention is also applicable in other systems in which a reference lever in a signal is required to be held at a fixed potential.

Numerous known arrangements which can be used for this purpose may be divided into two classes, those which effect control of the reference level by removal of existing errors only, and those—often referred to as "anticipatory" control devices—which on the assumption of a constant error rate produce some reduction in the error at times subsequent to their operation.

It is an object of the present invention to provide signal level control apparatus by means of which improved anticipatory control of reference level error may be obtained.

It is a further object of the invention to provide signal level control apparatus having improved performance as compared with known systems of comparable simplicity.

It is another object of the invention to provide signal level control apparatus employing transistors in which thermal unbalance is largely avoided.

Signal level control apparatus according to the invention may comprise the combination of a source of an input signal including periodically recurrent reference level portions; an input terminal; circuit means connecting said signal to said input terminal; an output terminal; a coupling circuit between said input terminal and said output terminal including a series capacitor. Apparatus according to the invention may also comprise drive pulse generator means producing pulses occurring during said recurrent signal portions, together with control pulse generator means responsive to a control signal and to said drive pulses to develop first and second control pulses of like polarity, the amplitudes of which vary oppositely when the amplitude of said control signal during said drive pulse varies from a predetermined value, means for applying said input signal to said control pulse generator; and means for applying said drive pulses to said control pulse generator. Apparatus according to the invention further includes a storage capacitor having first and second terminals; a point of constant potential; a direct connection from said second terminal of said capacitor to said point of constant potential; a direct current source having first and second poles; pulse controlled first current varying means connected to control the flow of current from said first pole of said current source to said first terminal of said storage capacitor; second pulse controlled current varying means connected to control the flow of current from said first terminal of said storage capacitor to said second pole of said current source; means for applying said first and second control pulses to control said first and second current varying means respectively; and circuit means for applying the potential appearing at said first terminal of said storage capacitor to control the potential of a point in said coupling circuit subsequent to said coupling capacitor.

Figure 2:
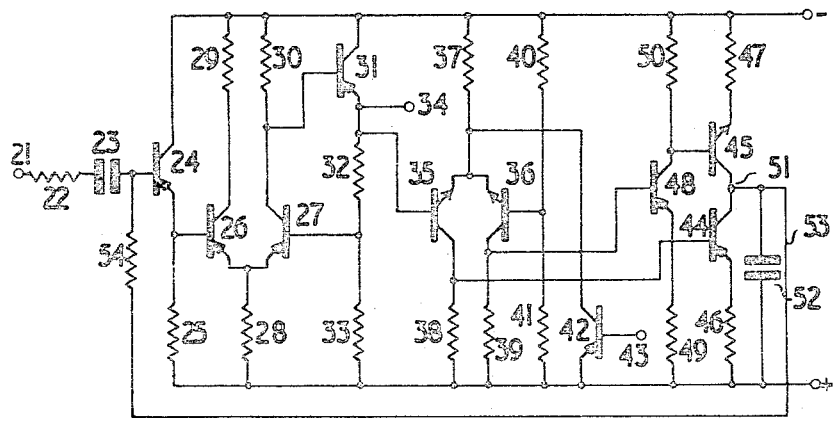
Figure 3:
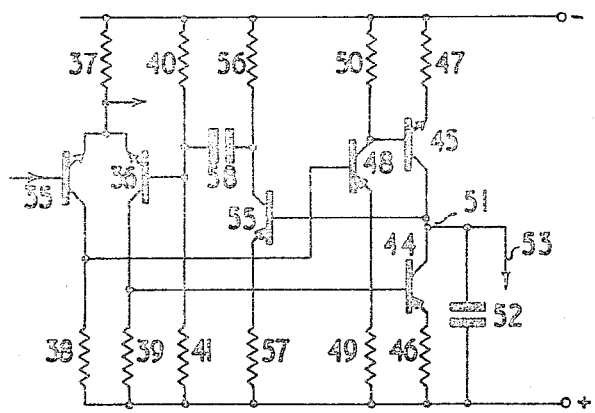

The features of the invention which are believed to be novel are recited with particularity in the appended claims. The invention, together with further features and advantages thereof, is best understood from the following description taken in conjunction with the accompanying drawings, in the several figures of which like elements are denoted by like reference numerals and in which:

FIGURE 1 is a block schematic diagram illustrating the principle of a signal level control circuit arrangement according to the present invention, FIGURE 2 is a circuit diagram of one embodiment of circuit arrangement according to the present invention, and FIGURE 3 is a partial circuit diagram of an alternative embodiment of the present invention which is advantageous under certain conditions.

In the arrangement illustrated schematically in FIGURE 1 television or other signals containing a periodically repetitive reference level are received at an input terminal 1 and are applied thence, by way of a coupling circuit 2 which together with the impedance of the signal source provides a time-constant of the order of the periodic time of the repetitive reference level, to an input electrode of a direct-coupled amplifier 3, the amplified output signal from which is taken for use as required by way of an output terminal 4.

The output signals from amplifier 3 are applied also to a circuit arrangement 5, controlled by pulses occurring during times when the output signal has the periodic reference value, which are received at a control terminal 6 from a suitable source. When the signals being processed are television signals, this source may be the synchronizing impulse generator which controls the production of the signals. Alternatively the pulse source may be a pulse generator synchronous with the repetitive reference signals.

However driven, circuit arrangement 5 is so designed as to develop two simultaneous output pulses of like polarity, the amplitudes of these impulses being equal when the reference level in the output signal has a desired value and their amplitudes varying oppositely in one direction or the other as the reference level rises above or falls below the desired value.

The pulses developed by circuit 5 are applied to the two inputs of a difference amplifier 7 which is arranged to develop on a storage capacitor 8 a potential proportional to the error in reference level. The potential thus developed is supplied by way of a resistance 9 to the input electrode of amplifier 3.

FIGURE 2 shows the circuit diagram of a practical embodiment of signal level control circuit arrangement according to the present invention which is suitable for black level control in a television system. In this arrangement television video signals containing blanking signals are received at an input terminal 21 and are applied by way of a series combination of a resistor 22, which includes or comprises the source impedance, and a capacitor 23 to the input electrode of a direct-coupled transistor amplifier. This input electrode is the base of an emitter-follower transistor 24, which is a p-n-p transistor having its collector taken directly to the negative supply line and its emitter returned through a load resistor 25 to the positive line. The signal appearing at the emitter of transistor 24 is applied directly to one base of an emitter-coupled pair comprising transistors 26 and 27, a common emitter resistor 28 and collector load resistors 29 and 30. The signal occurring at the collector of transistor 27 is applied to the base of an emitter-follower transistor 31, a fraction of the output of which, determined by resistors 32 and 33, is returned to the base of transistor 27, thus providing gain stabilization by negative feedback.

The amplified output signal appearing at the emitter of transistor 31 is applied to an output terminal 34 from which it may be taken for use as required. The same signal is also applied directly to the base of a n-p-n transistor 35 which together with a similar transistor 36 forms an emitter-coupled pair, the emitters being connected to the negative line by a common resistor 37. Transistors 35, 36 have respective collector load resistors 38, 39. The base of transistor 36 is held at a constant potential equal to the desired potential of the reference level in the output signal at terminal 34 by a voltage divider composed of resistors 40, 41 through which the base is returned to the negative and positive lines respectively.

The junction of the emitters of transistors 35, 36 with resistor 37 is connected to the positive supply line by way of the collector-emitter path of a p-n-p transistor 42, the base of which is connected to a terminal 43 at which is received from a conventional source a bias such that transistor 42 is normally bottomed, thus rendering transistors 35, 36 inoperative, together with positive-going impulses which cut off transistor 42 and thus make transistors 35, 36 operative. By conventional means such as are well known in the art, it is arranged that these control impulses occur during those periods in which the signal at output terminal 34 has the recurrent reference value. When this occurs the variation from equality of the currents passed by the two transistors 35 and 36 follows the departure from balance of the potentials appearing at each base. There thus arise at the collectors of transistors 35, 36 negative-going pulses of which the amplitudes vary complementarily in proportion to any variation of the reference level in the output signal at terminal 34 from the required value as set by voltage divider 40, 41.

The negative pulse appearing at the collector of transistor 36 is inverted by a unity grain transistor amplifier comprising a p-n-p transistor 48 having an emitter-lead feedback resistor 49 and a collector lead resistor 50 across which is taken the inverted pulse signal applied to the base of n-p-n transistor 45, and the negative and positive going pulses thus developed are applied to the bases of two complementary transistors 44, 45, the emitter collector paths of which are connected in series with respective equal emitter-lead resistors 46, 47 across the supply.

If, when a control impulse occurs, an error is present in the reference level of the signal appearing at output terminal 34 then the potential across capacitor 52 changes such that it modifies the signal appearing at the base of transistor 24 so as to rebalance the currents taken by transistors 35, 36. When this rebalancing is complete, under normal conditions this will occur during the first control impulse, the error at the output terminal 34 will have been reduced to zero.

If the time-constant of resistor 22 and capacitor 23 is very large compared with the interval between impulses then at each such impulse complete correction of any error present will occur.

If, however, this time-constant be made equal to the interval between impulses then not only will the error be completely corrected during each impulse but in addition correction will be made for an error increasing uniformly with time even between the control impulses. This is known as anticipatory control.

If the time-constant mentioned above is decreased to less than one half of the interval between impulses the circuit becomes unstable.

Other advantages of the circuit arrangement described above are that a very effective signal level control is obtained owing to the high loop gain and that the controlled level is substantially independent of temperature, since the base-emitter junction voltages of transistors 35, 36 cancel and the effects of leakage in these transistors are minimised since they drive transistors 44, 45 in the class C condition at comparatively high-level.

Further advantages reside in the relatively small number of components and devices which are required and in the provision of reasonably high input impedance and low output impedance.

Where the input signal has a large noise content it is advantageous to use anticipatory control only, since the disturbing effect of large noise impulses in producing a spurious reference level is considerably reduced by using only anticipatory control.

To produce wholly anticipatory control it is necessary to reduce to zero the effective impedance of the signal source which drives the control circuit arrangement, that is, to reduce to zero the value of resistor 22 and to cause the sampling circuit to be self-balancing to sudden changes in reference signal level. The former requirement may be achieved by a number of devices known in the art, while the latter may be accomplished by making use of a circuit arrangement similar to that of FIGURE 2 but modified as illustrated by FIGURE 3.

The potential arising across capacitor 52 of a circuit arrangement as described in relation to FIGURE 2 is, as before, applied by way of a lead 53 and resistor 54 to the input electrode of the amplifier (not shown). Here, however, this potential is also applied directly to the base of a transistor 55, which is provided with a collector-lead resistor 56 returned to the negative line and an emitter-lead resistor 57 providing suitable D.C. conditions returned to the positive line. The signal appearing at the collector of transistor 55 is applied by way of a capacitor 58 to the base of transistor 36, thus momentarily varying the relative amplitudes of the pulses developed at the collectors of transistors 35, 36 in such a manner as to make the changes of potential on storage capacitor 52 more accurately proportioned to change in the reference level occurring in the applied signal.

In a particular embodiment of the circuit arrangement hereinbefore described in relation to FIGURE 2 of the drawings the following component values were employed.

Capacitors:
- 23 ———————————————————— 0.47 μf.
- 52 ———————————————————— 0.47 μf.

Resistors:
- 22 ———————————————————— 330Ω
- 25 ———————————————————— 2.7 KΩ
- 29 ———————————————————— 680Ω
- 30 ———————————————————— 1 KΩ
- 32 ———————————————————— 330Ω
- 33 ———————————————————— 220Ω
- 37 ———————————————————— 180Ω
- 38 ———————————————————— 330Ω
- 39 ———————————————————— 100Ω
- 40 ———————————————————— 47Ω
- 41 ———————————————————— 150Ω
- 46 ———————————————————— 5Ω
- 47 ———————————————————— 15Ω
- 49 ———————————————————— 150Ω
- 50 ———————————————————— 150Ω

Transistors:
- 24 ———————————————————— ASZ 21
- 36 ———————————————————— AFZ 11
- 27 ———————————————————— AFZ 11
- 31 ———————————————————— ASZ 21
- 35 ———————————————————— OC 140
- 36 ———————————————————— OC 140
- 42 ———————————————————— OC 42
- 45 ———————————————————— OC 140
- 44 ———————————————————— OC 42
- 48 ———————————————————— OC 42

(All by Mullard).

In a particular embodiment of the circuit arrangement described in relation to FIGURE 3, the following component values were employed for those components which are additional to those of FIGURE 2.

Resistors:
56 _____ 150Ω
57 _____ 470Ω
Capacitor:
58 _____ 0.1 µf.
Transistor:
55 _____ OC 42
(Mullard).

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. Signal level control apparatus comprising, in combination: a source of an input signal including periodically recurrent reference level portions; an input terminal; circuit means connecting said input signal to said input terminal; an output terminal; a coupling circuit coupling said input terminal to said output terminal, said coupling circuit including a series coupling capacitor; drive pulse generator means producing pulses occurring during said recurrent signal portions; control pulse generator means responsive to a control signal and to drive pulses to develop first and second control pulses of like polarity, the amplitudes of said first and second control pulses varying oppositely when the amplitude of said control signal during said drive pulses has a value differing from a predetermined value; means for applying said input signal to said control pulse generator; means for applying said drive pulses to said control pulse generator; a storage capacitor having first and second terminals; a point of constant potential; a direct connection from said second terminal of said storage capacitor to said point of constant potential; a direct current source having first and second poles; first pulse controlled current varying means connected to control the flow of current from said source to said first terminal of said storage capacitor; second pulse controlled current varying means connected to control the flow of current from said first terminal of said storage capacitor to said second pole of said current source; means for applying said first and second control pulses to control said first and second current varying means respectively; and circuit means for applying the potential appearing at said first terminal of said storage capacitor to control the potential of a point in said coupling circuit subsequent to said coupling capacitor.

2. Signal level control apparatus according to claim 1, in which said coupling circuit includes a direct-coupled amplifier having an input terminal and an output terminal; said amplifier input terminal being connected to said coupling capacitor and said amplifier output terminal being connected to said output terminal of said control apparatus; and in which said circuit means connects the potential appearing on said first terminal of said storage capacitor to said amplifier input terminal.

3. Signal level control apparatus according to claim 1, in which said coupling circuit includes between said input terminal and said coupling capacitor a resistance having a predetermined value of resistance and said coupling capacitor has a predetermined value of capacitance; said predetermined values of resistance and capacitance being such as in combination to present a time-constant which is not less than one half the periodic time of said recurrent signal portions.

4. Signal level control apparatus according to claim 1, in which said coupling circuit includes between said input terminal and said coupling capacitor a resistance having a predetermined value of resistance and said coupling capacitor has a predetermined value of capacitance; said predetermined values of resistance and capacitance being such as in combination to present a time-constant which is not less than the periodic time of said recurrent signal portions.

5. Signal level control apparatus according to claim 1 in which said control pulse generator means comprises, in combination: a direct voltage source having first and second poles; first and second pulse transistors each having emitter, collector and base electrodes; a resistance connecting the emitter electrodes of both said transistors to said first pole of said voltage source; further resistors individually connecting said collector electrodes of said pulse transistors to said second pole of said voltage source; a drive transistor having emitter, collector and base electrodes; a direct connection from the emitter electrodes of said pulse transistors to one of the emitter and collector electrodes of said drive transistor; a direct connection from the remaining one of said emitter and collector electrodes of said drive transistor to said second pole of said voltage source; a source of a drive pulse signal having intermediate portions and drive pulse portions; means connecting said drive pulse signal to said base electrode of said drive transistor, said intermediate portions of said drive pulse signal having a potential such that said drive transistor is thereby made conductive and said pulse portions of said drive pulse signal having a potential such that said drive transistor is thereby cut off; an inverter transistor having emitter, collector and base electrodes; a direct connection from said base electrode of said inverter transistor to the collector of one of said pulse transistors; a resistor connecting the collector electrode of said inverter transistor to said first pole of said voltage source; a resistor connecting said emitter electrode of said inverter transistor to said second pole of said voltage source; and circuit means for taking said first and second control pulses from the collector of the other of said pulse transistors and from the collector of said inverter transistor respectively.

6. Signal level control apparatus according to claim 1 in which said first and second current varying means are constituted by, first and second control transistors of opposite conductivity types, each of said control transistors having emitter, collector and base electrodes; a direct connection from the collector electrode of each said control transistor to said first terminal of said storage capacitor; a direct connection from said second terminal of said storage capacitor to said second pole of said source; a resistor connecting the emitter electrode of said first control transistor to said second pole of said source; a like resistor connecting the emitter electrode of said second control transistor to said first pole of said source; and means for applying said first and said control pulse signals respectively to said base electrodes of said first and second transistors.

7. Signal level control apparatus according to claim 1 in which said control pulse generator means comprises, in combination: a direct voltage source having first and second poles; first and second pulse transistors each having emitter, collector and base electrodes; a resistance connecting the emitter electrodes of both said transistors to said first pole of said voltage source; further resistors individually connecting said collector electrodes of said pulse transistors to said second pole of said voltage source; a drive transistor having emitter, collector and base electrodes; a direct connection from the emitter electrodes of said pulse transistors to one of the emitter and collector electrodes of said drive transistor; a direct connection from the remaining one of said emitter and collector electrodes of said drive transistor to said second pole of said voltage source; a source of a drive pulse signal having intermediate portions and drive pulse portions; means connecting said drive pulse signal to said base electrode of said drive transistor, said intermediate portions of said drive pulse signal having a potential such that said drive transistor is thereby made conductive and said pulse portions of said drive pulse signal having a potential such that said drive transistor is thereby cut off; an inverter transistor having emitter, collector and base electrodes; a direct connection from said base electrode of said inverter transistor to the collector of one of said pulse transistors; a resistor connecting the collector electrode of said inverter transistor to said first pole of said voltage source; a resistor connecting said emitter electrode of said inverter transistor to said second pole of said voltage source; and circuit means for taking said first and second control pulses from the collector of the other of said pulse transistors and from the collector of said inverter transistor respectively, first and second control transistors of opposite conductivity types, each of said control transistors having emitter, collector and base electrodes; a direct connection from the collector electrode of each said control transistor to said first terminal of said storage capacitor; a direct connection from said second terminal of said storage capacitor to said second pole of said source; a resistor connecting the emitter electrode of said first control transistor to said second pole of said source; a like resistor connecting the emitter electrode of said second control transistor to said first pole of said source; and means for applying said first and said control pulse signals respectively to said base electrodes of said first and second transistors; a feedback transistor having emitter, collector and base electrodes; a direct connection from said first terminal of said second capacitor to said base electrode of said feedback transistor; a resistor connecting said emitter electrode of said feedback transistor to said second pole of said current source; a further resistor connecting said collector electrode of said feedback transistor to said first pole of said current source; and a capacitor connecting said collector electrode of said feedback transistor to the base electrode of said second transistor of said further pulse generator.

No references cited.

ARTHUR GAUSS, *Primary Examiner.*

R. H. EPSTEIN, *Assistant Examiner.*